Oct. 28, 1969     D. SIPOS     3,474,676
POISING MACHINE
Filed Dec. 22, 1967
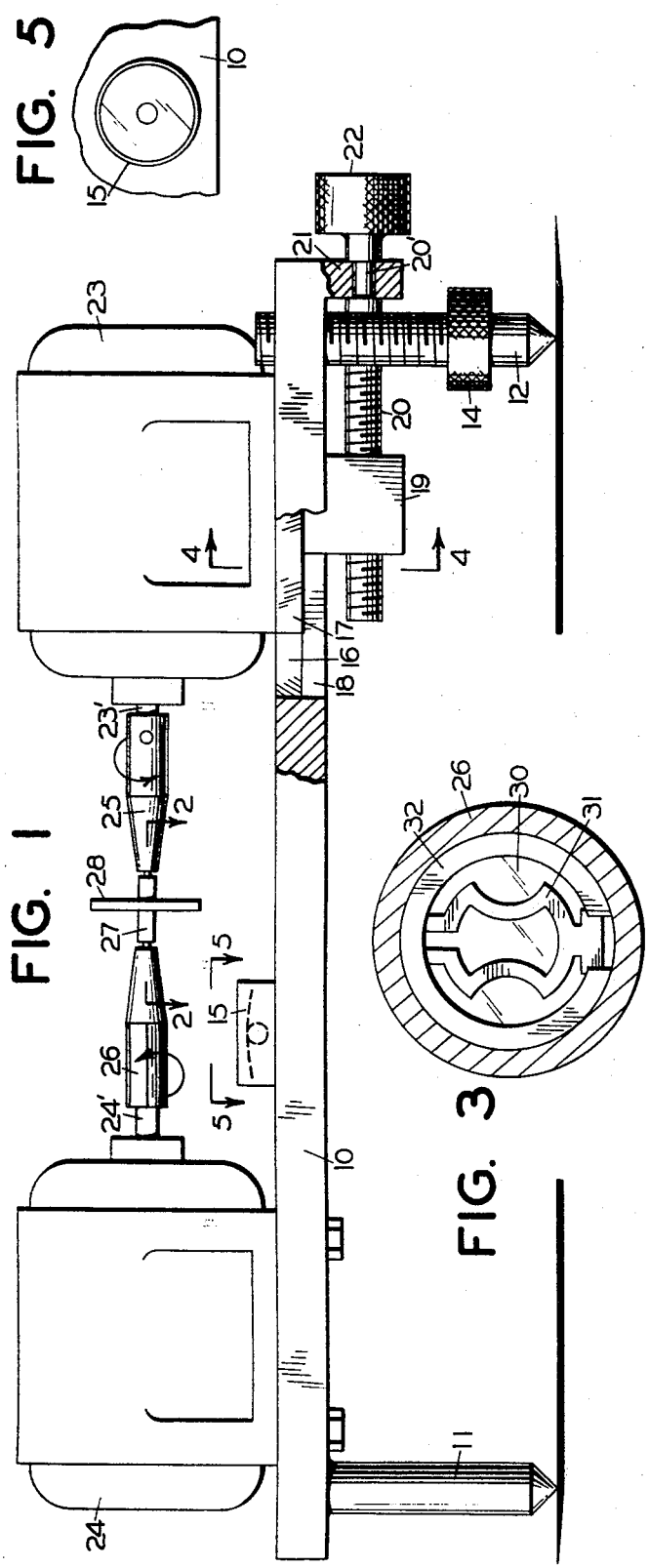
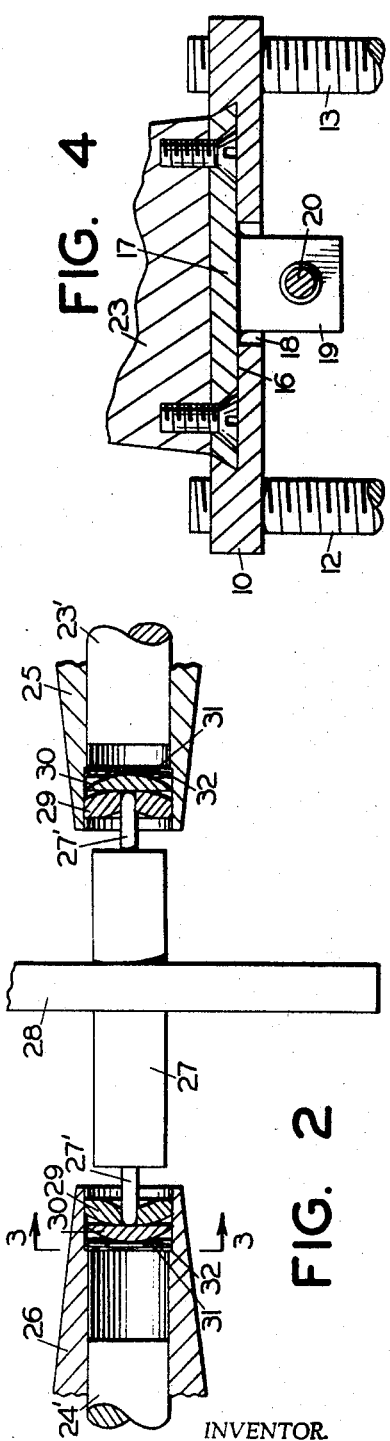
INVENTOR.
DEZSO SIPOS
BY  T. R. Geisler
ATTY.

United States Patent Office 3,474,676
Patented Oct. 28, 1969

3,474,676
POISING MACHINE
Dezso Sipos, Beaverton, Oreg. 97005
Filed Dec. 22, 1967, Ser. No. 692,991
Int. Cl. G01m 1/02
U.S. Cl. 73—480                                    4 Claims

ABSTRACT OF THE DISCLOSURE

A device, particularly suitable as a watchmaker's poising tool, for quickly and easily ascertaining whether a wheel is in proper balance. In the device the ends of the shaft of the wheel are placed respectively in a pair of assemblies which are caused to be rotated simultaneously at the same speed but in opposite directions.

BACKGROUND OF THE INVENTION

The testing of wheels for balance, to ascertain whether the periphery of the wheel has exactly the same weight throughout its 360°, and in particular the testing or poising of balance wheels in watches and clocks, ordinarily requires considerable time and attention. One very common method of checking balance wheels of watches and clocks is to place the opposite end portions of the wheel shaft respectively on a pair of parallel horizontal bars having knife-like top edges. The bars must be absolutely horizontal and the wheel must be moved carefully to determine whether it has any tendency to roll in one direction or another. This process is very slow and it is a recognized fact that it is generally not very satisfactory.

Special machines have been developed as a result of the desire to provide more satisfactory means for the poising of balance wheels. U.S. Patent No. 2,185,843, issued on Jan. 2, 1940; U.S. Patent No. 2,721,475, issued on Oct. 25, 1955; and U.S. Patent No. 3,020,682, issued on Feb. 13, 1962, describe devices of this type.

The object of the present invention is to provide an improved and simplified machine for such testing or poising which will be more practical, more reliable and quicker and easier to use.

SUMMARY OF THE INVENTION

The device of this invention makes use of a pair of identical reversible electric motors, the shafts of which rotate rapidly at the same speed. The motors are mounted opposite each other with their shafts in horizontal alignment, with the spacing between the opposed ends of the motor shafts adjustable. The ends of the shaft for the wheel to be tested are supported respectively in suitable bearing assemblies mounted on the ends of the motor shafts. The motors are then operated at the same rapid speed but in opposite directions. If a wheel is in perfect balance it will have a tendency to rotate at a very slow regular speed continuously in one direction. If it is not in perfect balance it will make a partial rotation in one direction and a partial rotation in the opposite direction.

BRIEF DESCRIPTION OF THE DRAWINGS

In the drawings:

FIG. 1 is a side elevation of the device illustrating the device in operation;

FIG. 2 is an enlarged fragmentary sectional elevation taken on line 2—2 of FIG. 1;

FIG. 3 is a section on line 3—3 of FIG. 2, drawn to a considerably enlarged scale;

FIG. 4 is a fragmentary section on line 4—4 of FIG. 1; and

FIG. 5 is a fragmentary top plan view taken on line 5—5 of FIG. 1.

DESCRIPTION OF THE PREFERRED EMBODIMENT

Since the most important use of the invention will be as a poising tool for watchmakers, the invention is so illustrated and will be so described.

Referring first to FIG. 1, the device includes a solid metal base or platform 10 which is supported on a rigidly secured leg at one end and is supported on the other end by a pair of adjustable legs 12 and 13 (see also FIG. 4), the adjustable legs having threads which are in engagement with the threads of corresponding apertures in the platform 10, and which legs have knurled collars, one of which is shown at 14 in FIG. 1 to facilitate their adjustment.

For the proper carrying out of the invention the platform 10 must be absolutely horizontal and consequently the platform is provided with a well known type of level indicator 15 (see also FIG. 5) comprising a sealed circular liquid container having an air bubble which will become centrally positioned in the container when the platform 10 is made absolutely level.

The top surface of one end of the platform 10 is formed with a channel 16 (FIGS. 1 and 4) to receive a slidable plate 17. The side walls of the channel 16 are undercut to conform to the sloped edges of the plate 17. A longitudinal slot 18 is provided in the bottom of the channel 16 to accommodate a block 19 secured to the bottom of the plate 17. The block 19 has a screw-threaded aperture through which an adjusting screw 20 passes. The adjusting screw has a smooth surface reduced diameter end portion 20' which passes through a corresponding aperture in a supporting bracket 21 which bracket extends downwardly from the end of the platform 10 and is integral therewith. A collar and finger knob 22 are secured on the outer end of the reduced diameter portion 20' of the screw shaft, and, as apparent from FIG. 1, the turning of the finger knob 22 enables the slide 17 to be adjusted longitudinally.

A reversible motor 23 (FIG. 1) is securely mounted on the adjustable plate 17. A substantially identical reversible motor 24 is secured to the platform 10. The two motors are so positioned that their shafts 23' and 24' respectively will be in accurate axial alignment. Also the two motors are so arranged that their shafts will be driven rapidly at the same speed but in opposite direction. Combined control means (not shown) are provided for the motors and so arranged that when the control is turned on the motors will rotate in opposite directions. The control means is also provided with reversing means which, when operated, will cause the directions of rotation of both motors simultaneously to be reversed.

A pair of chucks 25 and 26 are mounted on the ends of the shafts 23' and 24' respectively. One of the chucks, for example the chuck 26, is rigidly secured on the corresponding motor shaft. The other chuck is adjustably secured on its shaft by means of a suitable set screw. The chucks carry jewel bearings to provide anti-friction mountings for the pivots constituting the ends of the shaft of the watch or clock balance wheel to be tested. The motor 23 and its chuck 25 are carefully adjusted with respect to the opposed chuck and motor so that the pivots 27' at the ends of the shaft 27 of the balance wheel 28 (FIGS. 1 and 2) will be freely supported in the ends of the chucks with no appreciable friction.

The jewel bearings in the poising device, preferably as shown, consist, in each chuck, of an outer jewel 29 (see FIG. 2), having a central aperture for freely receiving the pivot of the balance wheel shaft, and an inner jewel 30 providing an end bearing for the pivot. The jewels 29 and 30 may be mounted in place in any suitable manner. For example, it has been found very satisfactory to mount the outer jewel 27 with a press fit in the chuck end with the outer jewel in turn loosely holding the inner jewel 30 in place. As an extra precaution against any possible damage to the delicate pivots on the ends of the shaft of a small balance wheel due to insufficient care in the adjusting of the position of one chuck with respect to the other during the mounting of the balance wheel and the shaft in position for testing, a flat paper-thin spring rest 31 is provided, preferably as shown in FIG. 3, for the inner jewel 30 to bear against. This spring rest 31 in turn is mounted in a thin split ring 32 which is channel shaped in cross section and is placed in the bottom of the cavity in the chuck end.

When the shank of the balance wheel to be tested has been properly set in place with the careful adjusting of the relative spacing of the supporting chucks, so that the balance wheel will rotate freely in the bearings provided by the chucks and with no appreciable friction, the two motors are turned on, causing their shafts to rotate rapidly at the same speed but in opposite directions. If the wheel is in proper balance it will show a tendency to rotate very slowly but continuously in one direction or another. The reversing of the directions of rotation of the two motors will produce the same effect except that the resulting rotational tendency of the wheel will be in the opposite direction. The exact reason for this I am not able to explain fully unless it is possibly due to the fact that there is a very slight difference in the speeds of the rapidly rotating opposing motor shafts, or to the fact that the balance wheels in watches and clocks are positioned slightly closer to one end of the wheel shaft than to the other.

This tendency on the part of the wheel, provided the wheel happens to be in proper balance, will immediately manifest itself, in which case no prolonged testing is necessary. On the other hand, if the wheel is not in proper balance it will not show a tendency to rotate in only one direction, but instead will make a partial rotation in one direction and a partial rotation in the reverse direction repeatedly, thus indicating that there is a heavier portion of the wheel periphery at some mid-point of the arcuate swing. This will also be immediately manifest so that the fact that the wheel is not in proper balance can be quickly ascertained.

Thus, with the employment of the poising machine of this invention, in a size appropriate for the size of the wheel to be tested, with the machine properly set up and adjusted, the actual poising operation can be performed very quickly and very cheaply.

I claim:
1. A poising machine comprising a base, means for supporting said base in a horizontal plane, a pair of substantially identical motors mounted on said base with their driven shafts in accurate horizontal alignment but with the working ends of their shafts in opposed position, a chuck on said working end of each of said shafts, bearing means in the outer ends of said chucks for supporting the respective ends of the shaft of the wheel to be tested, means for adjusting the spacing between said chucks and motors so as to enable the ends of said wheel shaft to be supported freely in said bearing means and chucks, said motors so constructed and arranged that they will be driven in opposite directions simultaneously at the same speed, whereby the wheel to be tested will be subjected to substantially identical but oppositely rotating means while having the ends of the wheel shaft freely supported in said rotating means.

2. The poising machine of claim 1 with said bearing means in the outer end of each of said chucks consisting of an outer jewel having a central aperture for receiving the pivot on the end of the shaft of the wheel being tested and an inner jewel for serving as an end bearing for the end of the pivot.

3. The poising machine of claim 2 with the addition of an inner spring mount serving as a rest for said inner jewel.

4. The poising machine of claim 1 with both of said motors reversible and with control means arranged for reversing the directions of rotation of said oppositely rotating motors.

References Cited

UNITED STATES PATENTS

| 2,935,904 | 5/1960 | Noack et al. | 73—460 |
| 2,721,475 | 10/1955 | Wallace | 73—480 |

JAMES J. GILL, Primary Examiner

H. GOLDSTEIN, Assistant Examiner